No. 709,824. Patented Sept. 23, 1902.
E. H. SCHILD.
EYEGLASSES.
(Application filed Apr. 9, 1902.)
(Model.)

Witnesses
Elmer Leavey
J. C. Glorius

Inventor
Edmund H. Schild
By Drury & Drury
Attorneys.

UNITED STATES PATENT OFFICE.

EDWARD H. SCHILD, OF BALTIMORE, MARYLAND.

EYEGLASSES.

SPECIFICATION forming part of Letters Patent No. 709,824, dated September 23, 1902.

Application filed April 9, 1902. Serial No. 102,054. (Model.)

*To all whom it may concern:*

Be it known that I, EDWARD H. SCHILD, a citizen of the United States of America, and a resident of Baltimore, State of Maryland, have invented certain new and useful Improvements in Eyeglasses, of which the following is a specification, reference being had therein to the accompanying drawings, in which—

Figure 1:
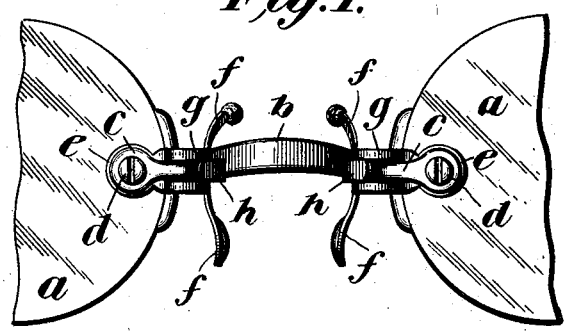
Figure 5:
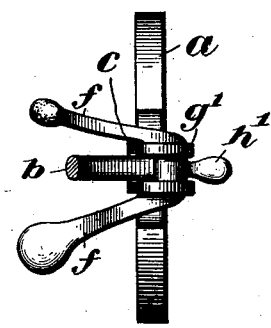
Figure 2:
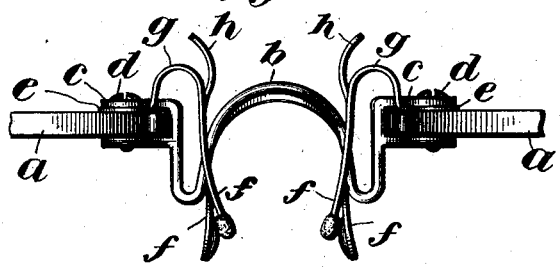
Figure 6:
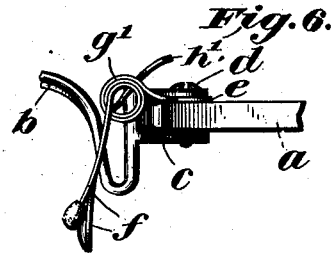
Figure 3:
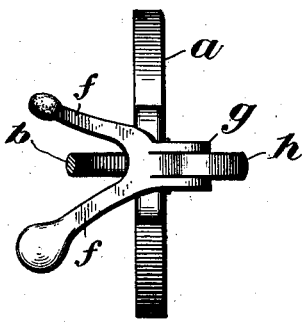
Figures 4, 7:
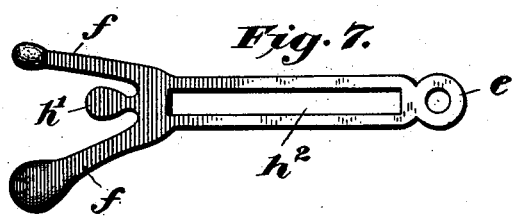

Figure 1 is a front view of a pair of eyeglasses provided with one embodiment of my invention; Fig. 2, a view thereof looking at the upper edges of the lenses; Fig. 3, a transverse vertical section taken through the bridge; Fig. 4, a detail plan view of the blank from which the guard, shown in the previous views is formed; Figs. 5, 6, and 7, views of another form of the guard.

This invention is designed to provide eyeglasses with simple and neat nose-clasping devices of such construction that a rigid nose-bridge may be employed, thus doing away with the usual spring-bows for connecting the lenses, that will permit the glasses to be applied properly and easily with but one hand, that will be inexpensive to make, that may be applied to the ordinary spectacles now on the market, and thus avoid the necessity of employing the usual ear-hooks for holding the lenses on the nose, that will insure the glasses setting much more comfortably on the nose, and thereby permit persons to wear them that are now so discommoded by the ordinary spring-bow glasses as to be compelled to use spectacles, that will more effectually and more properly hold the glasses on the nose, that may be readily repaired, and that will have other minor advantages hereinafter set forth.

Referring to the drawings by letters, $a$ designates the lenses, which are connected together by a rigid nose-bridge $b$ of the form ordinarily used in spectacles, the lens-mountings $c$ being clamped to the lenses in the usual manner by screws $d$.

Between the front member of each of the lens-mountings and the lens is clamped the eye $e$ of one of the nose-guards, which in the instance shown is constructed of a single plate of spring sheet metal whose free end is bifurcated to form two diverging arms $f$, provided with bearing-tips at their respective ends. The body of the plate is bent at $g$, and the arms $f$ are extended inward, so as to straddle the bridge and bear upon the side of the nose at two separated points, respectively, above and below the bridge. The bowed part $g$ projects forward slightly and affords the necessary resiliency to normally tend to press the arms $f$ toward each other when they are spread apart to place the glasses on the nose. The arms $f$ also are preferably resilient.

A finger-piece or handle is formed on each guard by longitudinally slitting the body of the plate to form a tongue $h$, which is extended forward and outward to be in easy position for grasping with the fingers.

These eyeglasses may be applied to the nose with but a single hand, it being simply necessary to grasp the finger-pieces $h$ between the thumb and forefinger of either hand and then spread the nose-tips by pressing the finger-pieces toward each other. They may be removed in the same simple manner.

With my improvements the ordinary rigid saddle-bridge employed on spectacles may be used, with the consequent advantages of nicety in regulating the pupilary distance. In fact, my device may be readily applied to spectacles of the ordinary make without any change whatever in the construction thereof, thus doing away with the usual ear-hooks attached to the outer ends of the lenses.

It will be seen, further, that my idea of using two separated bearing-surfaces for each member of the guard or clasp and making them movable in unison is greatly advantageous over the common practice of using a guard having a single continuous bearing-surface. In the latter it is impossible to have a firm bearing-surface the whole length of the guard on account of the bony prominences of the nose, and the center of pressure must therefore be restricted to one point, and that point will most likely be in the middle of the bearing-surface of the guard, where it will do the least good, whereas by using a small bearing-surface above the bridge and another below it, with an open space between to avoid any bony irregularities of the nose, security and comfort are obtained, and even though the two tips do not touch the nose at the same moment in placing the glasses there is sufficient resiliency in the arms to insure both tips coming into firm contact. It will be observed, further, that by making the lower tips movable with the upper tips all stretching of the skin across the nose (such as would result were these lower tips made stationary) is avoided, thus insuring a more comfortable and secure attachment of the glasses to the nose, as such stretching of the skin would no doubt result in both discomfort and insecurity, as the stretched skin would tend to throw the glasses forward off the nose.

Further advantages which contribute to the utility of the device lie in the fact that the guard can be cheaply made, as it can be readily stamped out of a single piece of sheet metal and then easily bent and coiled into shape; that it will be extremely neat in appearance and will require no skilled labor in applying it to the glases; that it can be made very light in weight and will therefore require but little precious metal; that the spring when coiled is the best form in which to use a spring, as it is not only least liable to break, but also gives the maximum amount of resiliency and an even pull within the limited angle in which the guard is compelled to move. A further advantage of very great practical importance is that the guards do not require a special form of bridge, but may be used on the common spectacle-bridges, whereby a dealer who desires to handle my guards need only keep in stock the guards themselves without extra bridges or other parts. It will be observed, further, that by clamping one end of each of the guards rigidly to the lens-mounting and making a portion of the body of the guard between said point of attachment and the arms resilient pivots and separate springs are rendered unnecessary, thereby contributing greatly to simplicity and durability. By thus attaching one end of the guard to the lens and doing away with separate pivotal or other supports the end portion of the guard itself forms the sole support for the guard.

While I claim and desire to cover the details of construction herein shown and described, I wish it understood that I do not confine myself in this respect, as many changes may be made without departing from the invention in the least. For instance, the body portion of the guard may be made longer and coiled upon itself to form a convolute spring $g'$, as shown in Figs. 5, 6, and 7, and thereby afford a higher degree of elasticity. In this form the handle or finger-piece is best formed in the crotch of the arms $f$ and extended through a longitudinal slot $h''$ in the plate, so as to be in proper position in front of the lens. It will be obvious also that it is not essential that the guard be made in a single piece, as the handle and the arms may be made separately and attached to the spring body portion. It will be noted also that the guard may be made of spring-wire instead of a flat plate shown.

Having thus fully described my invention, what I claim, and desire to obtain by Letters Patent, is—

1. In combination with a pair of lenses and a bridge connecting the same, of a pair of nose-guards, each being supported at one end and having its other end free and provided with a nose-engaging part extending inward past the bridge, a portion of the body of the guard lying in front of the bridge and forming a spring to normally press said nose-engaging part toward the nose-engaging part carried by the other guard.

2. In combination with a pair of lenses and a bridge connecting the same, of a pair of nose-guards, each being supported at one end and having its other end free and provided with a nose-engaging part extending inward past the bridge, a portion of the body of the guard lying in front of the bridge and forming a spring to normally press said arms toward the pair carried by the other guard, and a handle attached to each guard in front of the bridge.

3. In combination with a pair of lenses and a connecting nose-bridge, of a pair of nose-guards, each being rigidly supported at one end adjacent to the lens-mounting and having its other end free and provided with diverging arms straddling the bridge and extending inward and provided with bearing-tips, the body portion of each guard between its point of attachment and said arms being resilient and serving to normally press the bearing-tips of one guard toward those of the other guard, and a handle or finger-piece carried by each guard in front of the lenses and bridge.

4. In combination with a pair of lenses and a connecting nose-bridge, of a pair of nose-guards each constructed of a single piece of metal having one end formed into two diverging arms and its other end into an eye, the body portion between the eye and the arms being formed into a spring and each guard being provided with a handle.

5. In combination, a pair of lenses, a connecting nose-bridge, a nose-guard attached rigidly at each end of the bridge and provided with a pair of arms diverging and extending inward and straddling the bridge, the body portion of the guard between its point of attachment and the arms being coiled into a spring, a handle or finger-piece attached to each guard in front of the bridge and lenses.

6. In combination with a pair of lenses and a connecting nose-bridge, of a nose-guard attached at each end of the bridge and having its free end provided with a nose-engaging part extending beyond the bridge, the body of the guard in front of the bridge being coiled into a spring, and a finger-piece attached to the inner end of the spring and working through a slot in the body of the coil.

7. The combination with a pair of lenses and a connecting nose-bridge, of a pair of nose-guards, each being rigidly supported at one end adjacent to the lens-mounting and having its other end free and provided with a nose-engaging part extending inward past the bridge, the body portion of each guard between its point of attachment and the bearing-tips of the nose-engaging part being resilient and serving to normally press the bearing-tips of one guard toward those of the other guard, and a handle or finger-piece carried by each guard in front of the lenses and bridge.

8. The combination with a pair of lenses and a connecting nose-bridge, of a pair of nose-guards, each being supported at one end adjacent to the lens-mounting and having its other end free and provided with a nose-engaging part, the body portion of each guard between its point of attachment and the bearing-tips of the nose-engaging part being coiled into a convolute spring the tendency of which is to normally press one nose-engaging part toward the other, and a handle or finger-piece carried by each guard in front of the lenses and bridge.

In testimony whereof I hereunto affix my signature, in the presence of two witnesses, this 31st day of March, 1902.

EDW. H. SCHILD.

Witnesses:
   NANNIE WELLER,
   TERESA M. BLONDELL.